US009792505B2

United States Patent
Yu et al.

(10) Patent No.: US 9,792,505 B2
(45) Date of Patent: Oct. 17, 2017

(54) VIDEO MONITORING METHOD, VIDEO MONITORING SYSTEM AND COMPUTER PROGRAM PRODUCT

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Gang Yu, Beijing (CN); Chao Li, Beijing (CN); Zeyuan Shang, Beijing (CN)

(73) Assignees: BEIJING KUANGSHI TECHNOLOGY CO., LTD., Beijing (CN); PINEHOLE (BEIJING) TECHNOLOGY CO., LTD., Beijing (CN)

(*) Notice: Subject to any disclaimer, the term of this patent is extended or adjusted under 35 U.S.C. 154(b) by 103 days.

(21) Appl. No.: 14/888,357

(22) PCT Filed: Mar. 26, 2015

(86) PCT No.: PCT/CN2015/075126
§ 371 (c)(1),
(2) Date: Oct. 30, 2015

(87) PCT Pub. No.: WO2016/149938
PCT Pub. Date: Sep. 29, 2016

(65) Prior Publication Data
US 2017/0032194 A1 Feb. 2, 2017

(51) Int. Cl.
*G06K 9/00* (2006.01)
*G06K 9/62* (2006.01)
(Continued)

(52) U.S. Cl.
CPC ..... *G06K 9/00778* (2013.01); *G06K 9/00744* (2013.01); *G06K 9/62* (2013.01);
(Continued)

(58) Field of Classification Search
CPC .......... G06K 9/00778; G06K 9/00744; G06K 2009/00738; G06T 2207/10021; G06T 2207/30196; G06T 2207/30232
See application file for complete search history.

(56) References Cited

U.S. PATENT DOCUMENTS 7,263,209 B2 * 8/2007 Camus ............... G06K 9/00201
340/425.5
2004/0061781 A1 4/2004 Fennell et al.
(Continued)

FOREIGN PATENT DOCUMENTS

CN 101068342 11/2007
CN 101727671 6/2010
(Continued)

OTHER PUBLICATIONS

Third Chinese Office Action, issued in the corresponding Chinese patent application No. 201580000334.1, dated Jan. 16, 2017, 8 pages.
(Continued)

*Primary Examiner* — John Strege
(74) *Attorney, Agent, or Firm* — Hamre, Schumann, Mueller & Larson, P.C.

(57) ABSTRACT

The present disclosure relates to a video monitoring method based on a depth video, a video monitoring system and a computer program product. The video monitoring method comprises: obtaining video data collected by a video collecting apparatus; determining an object as a monitoring target based on the video data; and extracting feature infor-
(Continued)

mation of the object, wherein the video data is video data containing depth information.

21 Claims, 11 Drawing Sheets

(51) Int. Cl.
*G06T 7/246* (2017.01)
*G06T 7/254* (2017.01)
*G06T 7/62* (2017.01)

(52) U.S. Cl.
CPC .............. *G06T 7/248* (2017.01); *G06T 7/254* (2017.01); *G06T 7/62* (2017.01); *G06K 2009/00738* (2013.01); *G06T 2207/10016* (2013.01); *G06T 2207/10021* (2013.01); *G06T 2207/10028* (2013.01); *G06T 2207/20021* (2013.01); *G06T 2207/30196* (2013.01); *G06T 2207/30232* (2013.01)

(56) References Cited

U.S. PATENT DOCUMENTS

| | | | | |
|---|---|---|---|---|
| 2011/0091131 | A1* | 4/2011 | Price | G06T 3/0018 382/294 |
| 2011/0128555 | A1* | 6/2011 | Rotschild | G02B 27/2271 356/625 |
| 2011/0205340 | A1* | 8/2011 | Garcia | G01S 7/4972 348/46 |
| 2013/0182114 | A1 | 7/2013 | Zhang et al. | |
| 2014/0072170 | A1* | 3/2014 | Zhang | G06K 9/00369 382/103 |
| 2015/0181198 | A1* | 6/2015 | Baele | H04N 13/0246 348/46 |

FOREIGN PATENT DOCUMENTS

CN 102722721 10/2012
CN 103716579 4/2014

OTHER PUBLICATIONS

Chinese Office Action, issued in the corresponding Chinese patent application No. 201580000334.1, dated Aug. 2, 2016, 10 pages.
International Search Report and Written Opinion issued in the corresponding International application No. PCT/CN2015/075126, dated Jan. 11, 2016, 18 pages.
Chinese Office Action, issued in the corresponding Chinese patent application No. 201580000334.1, dated Oct. 17, 2016, 8 pages.

\* cited by examiner

VIDEO MONITORING METHOD, VIDEO MONITORING SYSTEM AND COMPUTER PROGRAM PRODUCT

TECHNICAL FIELD OF THE DISCLOSURE

The present disclosure relates to the field of video monitoring, and more specifically, to a video monitoring method, a video monitoring system and a computer program product based on a depth video.

BACKGROUND

Current image or video monitoring usually needs to rely on manual detection and processing of operators. More and more scenes (e.g., airports, stations, shopping malls, streets among others) are covered by cameras; however, because the monitoring system cannot analyze and track features of passengers by itself, lots of manpower is needed to perform processing and monitoring. This manner needs to deploy lots of manpower to perform monitoring and administration, and with further increase of number of cameras, it is hard to perform efficient processing or respond to emergencies.

The object of intelligent monitoring is to automatically track passengers in the video scene based on image data, and perform analysis and processing to characteristics and behaviors of each passenger. Currently, the intelligent monitoring usually only relies on conventional non-depth cameras (RGB cameras). The tracking of passengers is not accurate and is limited by the action gestures of passengers in the scene due to the limit of the camera itself, therefore, the analysis based on features of passengers cannot reach the expected effect. Depth cameras (depth video cameras) have been widely applied to application scenes such as human-machine interaction currently, but there is no mature system and method to expand their application to the intelligent monitoring field currently. Particularly, existing monitoring systems cannot realize accurate analysis on features (e.g., height, weight, motion speed) of passengers or effective detection of abnormal behaviors of passengers.

SUMMARY

The present disclosure is provided in view of the above problems. The present disclosure provides a video monitoring method, a video monitoring system and a computer program product based on a depth video, which can effectively track passengers in a scene with high speed and accurately analyze feature information of passengers in real time, such as to realize statistic analysis of the scene and monitoring of abnormal situations.

According to an embodiment of the present disclosure, there is provided a video monitoring method comprising: obtaining video data collected by a video collecting apparatus; determining an object as a monitoring target based on the video data; and extracting feature information of the object, wherein the video data is video data containing depth information.

Further, the video monitoring method according to an embodiment of the present disclosure further comprises: configuring the video collecting apparatus and determining coordinate parameters of the video collecting apparatus.

Further, in the video monitoring method according to an embodiment of the present disclosure, determining coordinate parameters of the video collecting apparatus comprises: selecting multiple reference points on a predetermined reference plane; determining transformation relationship between a camera coordinate system of the video collecting apparatus and a world coordinate system based on coordinate information of the multiple reference points; and determining the coordinate parameters of the video collecting apparatus based on the transformation relationship.

Further, in the video monitoring method according to an embodiment of the present disclosure, determining an object as a monitoring target based on the video data comprises: determining background information in the video data; determining foreground information in each frame of the video data based on the background information; obtaining edge profile information of a foreground area corresponding to the foreground information; and determining the object based on the edge profile information.

Further, in the video monitoring method according to an embodiment of the present disclosure, determining the object based on the edge profile information comprises: obtaining a candidate block based on the edge profile information; determining the candidate block larger than a first predetermined threshold as a candidate object; and obtaining an evaluation value of the candidate object based on a predetermined algorithm, and determining the candidate object whose evaluation value larger than a second predetermined threshold as the object.

Further, in the video monitoring method according to an embodiment of the present disclosure, determining the object based on the edge profile information further comprises: matching each object determined in the previous frame with each object determined in current frame to determine an object that left the previous frame.

Further, in the video monitoring method according to an embodiment of the present disclosure, the feature information of the object comprises bodily form information and motion speed of the object.

Further, in the video monitoring method according to an embodiment of the present disclosure, extracting the bodily form information of the object comprises: selecting the nearest point of the object to the video collecting apparatus as a head point of the object; determining coordinate parameters of the head point in the world coordinate system based on the transformation relationship between the camera coordinate system of the video collecting apparatus and the world coordinate system; and determining the distance between the head point of the object and the ground as height information of the object based on the coordinate parameter of the head point in the world coordinate system.

Further, in the video monitoring method according to an embodiment of the present disclosure, extracting the bodily form information of the object comprises: selecting the nearest point of the object to the video collecting apparatus as a head point of the object; selecting a point of the objection with the largest value in the ordinate of an image coordinate system as a sole point of the object; determining the distance between the head point of the object and the sole point of the object in the world coordinate system as height information of the object based on the transformation relationship between the camera coordinate system of the video collecting apparatus and the world coordinate system.

Further, the video monitoring method according to an embodiment of the present disclosure further comprises: calculating a motion distance of a first fixed point of the object between a first selected frame and a second selected frame in the world coordinate system; determining the motion speed of the object based on the time interval between the first selected frame and the second selected frame and the motion distance.

Further, in the video monitoring method according to an embodiment of the present disclosure, extracting the bodily form information of the object further comprises: extracting height information and profile information of the object; determining weight information of the object according to the height information and the profile information of the object based on correspondence relationship among height information, profile information and weight information of various objects collected in advance.

Further, the video monitoring method according to an embodiment of the present disclosure further comprises: analyzing the feature information and determining an abnormal event of the object, wherein analyzing the feature information and determining an abnormal event of the object comprises: determining the abnormal event of the object when the variation of the bodily form information in a predetermined period of time is larger than a predetermined third threshold and/or when the motion speed of the object is larger than a fourth threshold.

According to another embodiment of the present disclosure, there is provided a video monitoring system comprising: a processor; a memory; and computer program instructions stored in the memory, which, when executed by the processor, perform the steps of: obtaining video data collected by a video collecting apparatus; determining an object as a monitoring target based on the video data; and extracting feature information of the object, wherein the video data is video data containing depth information.

Further, the video monitoring system according to another embodiment of the present disclosure further comprises the video collecting apparatus for collecting the video data.

Further, in the video monitoring system according to another embodiment of the present disclosure, the computer program instructions, when executed by the processor, further perform the steps of: selecting multiple reference points on a predetermined reference plane; determining transformation relationship between a camera coordinate system of the video collecting apparatus and a world coordinate system based on coordinate information of the multiple reference points; and determining the coordinate parameters of the video collecting apparatus based on the transformation relationship.

Further, in the video monitoring system according to another embodiment of the present disclosure, the step of determining an object as a monitoring target based on the video data performed by the computer program instructions when executed by the processor comprises: determining background information in the video data; determining foreground information in each frame of the video data based on the background information; obtaining edge profile information of a foreground area corresponding to the foreground information; and determining the object based on the edge profile information.

Further, in the video monitoring system according to another embodiment of the present disclosure, the step of determining the object based on the edge profile information performed by the computer program instructions when executed by the processor comprises: obtaining a candidate block based on the edge profile information; determining the candidate block larger than a first predetermined threshold as a candidate object; and obtaining an evaluation value of the candidate object based on a predetermined algorithm, and determining the candidate object whose evaluation value larger than a second predetermined threshold as the object.

Further, in the video monitoring system according to another embodiment of the present disclosure, the step of determining the object based on the edge profile information performed by the computer program instructions when executed by the processor further comprises: matching each object determined in the previous frame with each object determined in current frame to determine an object that left the previous frame.

Further, in the video monitoring system according to another embodiment of the present disclosure, the feature information of the object comprises bodily form information and motion speed of the object.

Further, in the video monitoring system according to another embodiment of the present disclosure, the step of extracting the bodily form information of the object performed by the computer program instructions when executed by the processor comprises: selecting the nearest point of the object to the video collecting apparatus as a head point of the object; determining coordinate parameters of the head point in the world coordinate system based on the transformation relationship between the camera coordinate system of the video collecting apparatus and the world coordinate system; and determining the distance between the head point of the object and the ground as height information of the object based on the coordinate parameter of the head point in the world coordinate system.

Further, in the video monitoring system according to another embodiment of the present disclosure, the step of extracting the bodily form information of the object performed by the computer program instructions when executed by the processor comprises: selecting the nearest point of the object to the video collecting apparatus as a head point of the object; selecting a point of the objection with the largest value in the ordinate of an image coordinate system as a sole point of the object; determining the distance between the head point of the object and the sole point of the object in the world coordinate system as height information of the object based on the transformation relationship between the camera coordinate system of the video collecting apparatus and the world coordinate system.

Further, in the video monitoring system according to another embodiment of the present disclosure, the step of extracting the feature information of the object performed by the computer program instructions when executed by the processor further comprises: calculating a motion distance of a first fixed point of the object between a first selected frame and a second selected frame in the world coordinate system; determining the motion speed of the object based on the time interval between the first selected frame and the second selected frame and the motion distance.

Further, in the video monitoring system according to another embodiment of the present disclosure, the step of extracting the bodily form information of the object performed by the computer program instructions when executed by the processor further comprises: extracting height information and profile information of the object; determining weight information of the object according to the height information and the profile information of the object based on correspondence relationship among height information, profile information and weight information of various objects collected in advance.

Further, in the video monitoring system according to another embodiment of the present disclosure, the computer program instructions, when executed by the processor, further perform the steps of: analyzing the feature information and determining an abnormal event of the object, and the step of determining an abnormal event of the object performed by the computer program instructions when executed by the processor comprises: determining the abnormal event of the object when the variation of the bodily form information in a predetermined period of time is larger than a predetermined third threshold and/or when the motion speed of the object is larger than a fourth threshold.

According to yet another embodiment of the present disclosure, there is provided a computer program product comprising a computer readable storage medium on which computer program instructions are stored, wherein the computer program instructions, when executed by the processor, perform the steps of: obtaining video data collected by a video collecting apparatus; determining an object as a monitoring target based on the video data; and extracting feature information of the object, wherein the video data is video data containing depth information.

It is understood that both the above general description and the following detailed description are illustrative, and are intended to provide further explanation on the technologies to be claimed.

BRIEF DESCRIPTION OF THE DRAWINGS

The above and other objects, features and advantages of the present disclosure will become more apparent by more detailed descriptions of embodiments of the present disclosure in connection with figures. The figures are used to provide further understanding of embodiments of the present disclosure, constitute part of the specification, explain the present disclosure together with embodiments of the present disclosure, but not limit the present disclosure. In the figures, the same reference numbers usually represent the same elements or steps.

DETAILED DESCRIPTION

In order to make objects, technical solutions and advantages of the present disclosure more obvious, exemplary embodiments of the present disclosure will be described in detail with reference to the figures in the following. Obviously, the described embodiments are only part embodiments of the present disclosure, but not all the embodiments. It should be understood that the present disclosure is not limited by exemplary embodiments described herein. All other embodiments obtained by those skilled in the art based on the embodiments described in the present disclosure without creative work fall in the protection scope of the present disclosure.

In the following, preferable embodiments of the present disclosure will be described in detail with reference to the figures.

Figure 1:
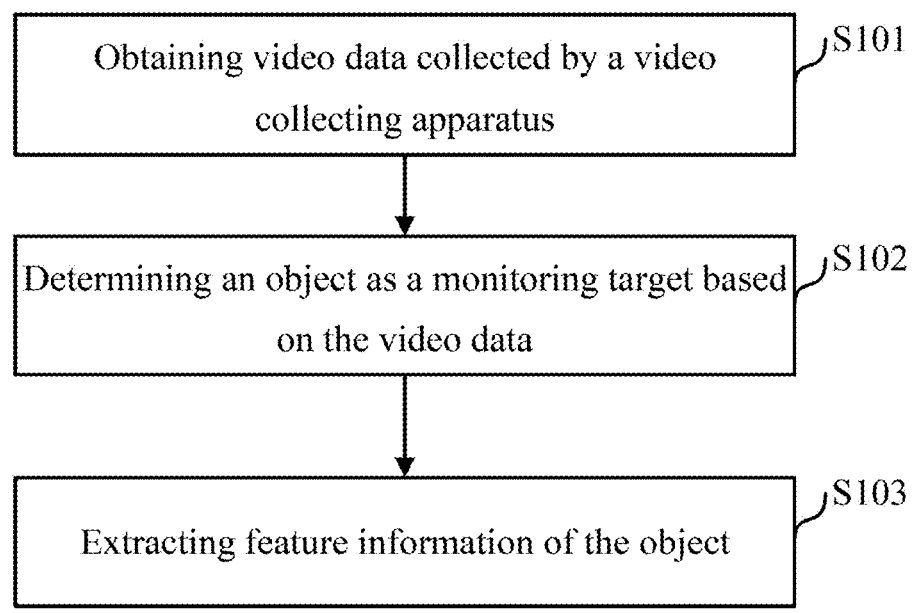
FIG. 1 is a flowchart illustrating a video monitoring method according to an embodiment of the present disclosure.

FIG. 1 is a flowchart illustrating a video monitoring method according to an embodiment of the present disclosure. As shown in FIG. 1, a video monitoring method according to an embodiment of the present disclosure comprises the following steps.

In step S101, video data collected by a video collecting apparatus is obtained. In an embodiment of the present disclosure, the video collecting apparatus is a depth camera (depth video camera) that can obtain depth information of a subject to be captured. Obtaining video data collected by a video collecting apparatus comprises, but is not limited to, receiving video data sent from the video collecting apparatus via a wired or wireless manner after the video collected apparatus arranged separately in physical position collects the video data. Alternatively, the video collecting apparatus can be physically located at the same position or even inside the same housing with other modules or components in the video monitoring system. Other modules or components in the video monitoring system receive video data sent from the video collecting apparatus. Then the process enters step S102.

In step S102, an object is determined as a monitoring target based on the video data. In an embodiment of the present disclosure, the object as the monitoring target is a passenger or another object (such as a vehicle or animal) recorded in the video data. Determining the object as the monitoring target generally comprises performing background modeling on the depth video data, then determining foreground information in each frame based on the background data, and obtaining edge profile information of a foreground area based on a predetermined algorithm, such as to determine whether it is the object to be monitored based on the profile of each foreground area. The process of how to determine the object as the monitoring target will be further described in detail with reference to figures in the following. Then, the process enters step S103.

In step S103, feature information of the object is extracted. In an embodiment of the present disclosure, the feature information of the object comprises, but is not limited to, any of height, weight, motion speed, among others of the object. The process of how to extract feature information of the object will be further described in detail with reference to figures in the following.

The above video monitoring method according to an embodiment of the present disclosure adopts a depth camera/video camera as the video collecting apparatus, such as to realize object detection and feature information extraction based on depth video information to provide accurate and efficient data guarantee for further data analysis and abnormal situation monitoring.

In the following, a video monitoring system performing the above video monitoring method is further described with reference to FIG. 2.

Figure 2:
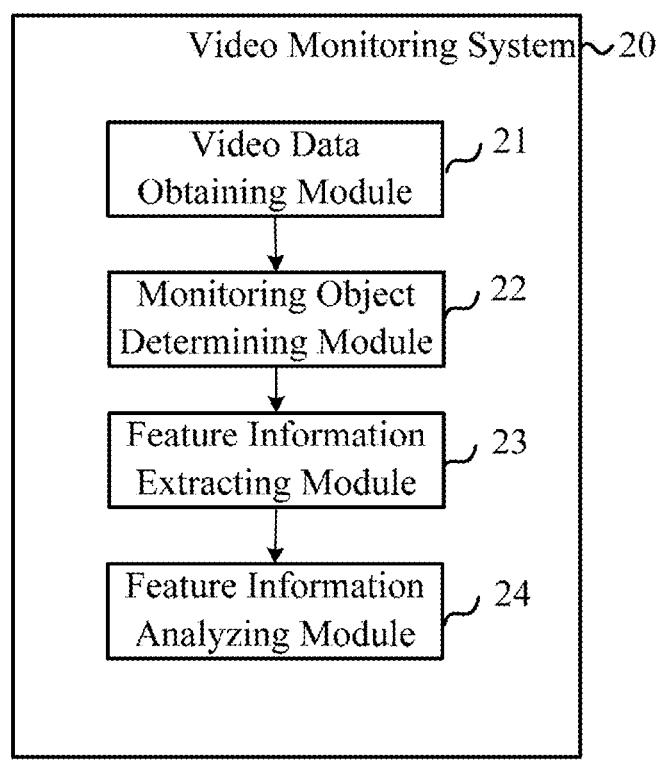
FIG. 2 is a functional block diagram illustrating a video monitoring system according to an embodiment of the present disclosure.

FIG. 2 is a functional block diagram illustrating a video monitoring system according to an embodiment of the present disclosure. As shown in FIG. 2, the video monitoring system 20 according to the embodiment of the present disclosure comprises a video data obtaining module 21, a monitoring object determining module 22, a feature information extracting module 23 and a feature information analyzing module 24. The video data obtaining module 21, the monitoring object determining module 22, the feature information extracting module 23 and the feature information analyzing module 24 can for example be configured by hardware (server, dedicated computer, or the like), software, firmware, or any suitable combination of the above.

In particular, the video data obtaining module 21 is configured to obtain video data. In an embodiment of the present disclosure, The video data obtaining module 21 can comprises a video collecting apparatus of a depth camera (depth video camera) that can obtain depth information of the subject to be captured. The video collecting apparatus can be physically separated from, or physically located at the same position or even inside the same housing with the subsequent monitoring object determining module 22, the feature information exacting module 23 and the feature information analyzing module 24. In the case that the video collecting apparatus is physically separated from the subsequent monitoring object determining module 22, the feature information exacting module 23 and the feature information analyzing module 24, the video data obtaining module 21 further transmits the depth video data obtained by the video collecting apparatus to the subsequent modules via a wired or wireless manner. In the case that the video collecting apparatus is physically located at the same position or even inside the same housing with the subsequent monitoring object determining module 22, the feature information exacting module 23 and the feature information analyzing module 24, the video data obtaining module 21 transmits the depth video data obtained by the video collecting apparatus to the subsequent modules via an internal bus. The video data can comprise depth video data and chromatic video data. More specifically, it is possible to determine three dimensional position parameters of each pixel in the video data according to position parameters of the video collection apparatus and a depth information value of each pixel in the video data. Before the video data is transmitted via a wired or wireless manner or via an internal bus, its predetermined format can be encoded and compressed as a video data packet to reduce communication quantity and bandwidth needing to be occupied by the transmission.

The monitoring object determining module 22 is configured to determine an object as a monitoring target based on the video data obtained by the video data obtaining module 21. The monitoring object determining module 22 can for example perform background modeling on the depth video data, then determine foreground information in each frame based on the background data, and obtain edge profile information of a foreground area based on a predetermined algorithm, such as to determine whether it is the object to be monitored based on the profile of each foreground area. More specifically, the monitoring object determining module 22 can detect whether a passenger is stored in each frame of the video, and determine the specific position of each passenger. Matching and associating are performed on passengers in different frames to prepare for tracking of a passenger in different frames.

The feature information extracting module 23 is configured to extracting feature information (such as height, weight, and motion speed among others) of each object to be monitored for the object to be monitored determined by the monitoring object determining module 22 based on the video data obtained from the video data obtaining module 21.

The feature information analyzing module 24 is configured to perform storage, statistic analysis and abnormal situation monitoring on the feature information extracted by the feature information extracting module 23. More specifically, the stored data comprises, but is not limited to, position of a passenger in each frame, feature information of each passenger, and specific timing of each frame of image, among others. The feature information analyzing module 24 analyzes the feature information in real time to monitor abnormal situations potentially to occur, and organizes the feature information stored for a long time and exacts its statistic pattern, for example, at what time more passenger occur, average height or weight of passengers, among others.

In the following, each specific step procedure of a video monitoring method according to an embodiment of the present disclosure performed by a respective module of a video monitoring system according to an embodiment of the present disclosure will be further described in detail with reference to figures.

Figure 3:
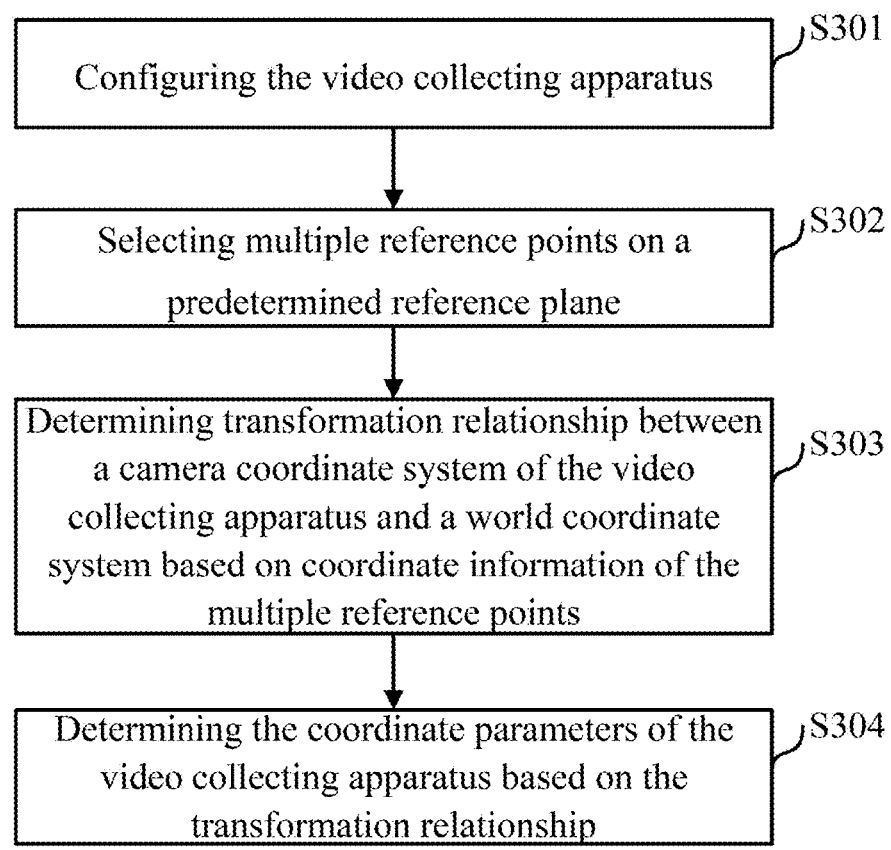
FIG. 3 is a flowchart further illustrating configuring and determining parameters of the video collecting apparatus in a video monitoring method according to an embodiment of the present disclosure.
Figure 4:
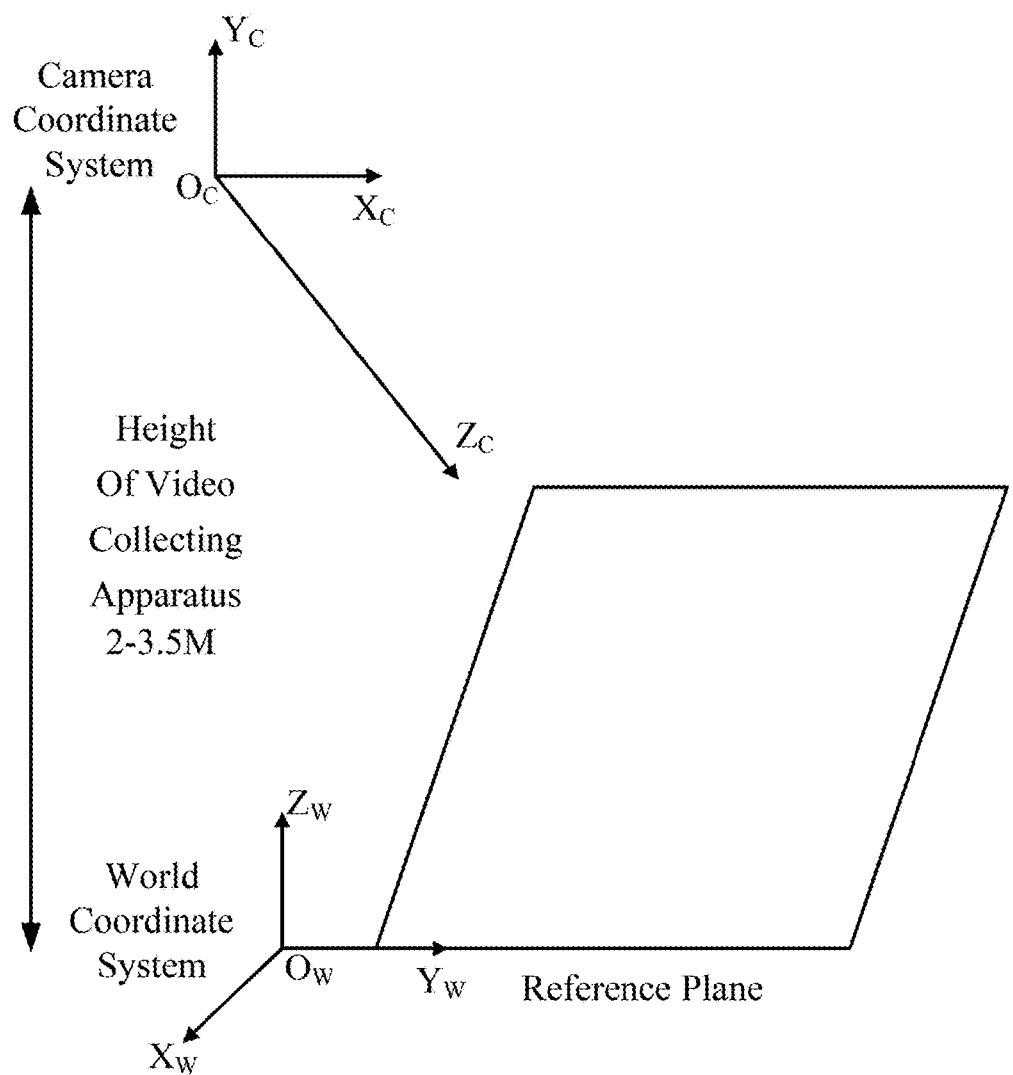
FIG. 4 is a schematic diagram of a camera coordinate system and a world coordinate system for determining parameters of the video collecting apparatus.

First, the configuration of the video collecting apparatus and determination of coordinate parameters of the video collecting apparatus will be described with reference to FIG. 3 and FIG. 4. The configuration of the video collecting apparatus and determination of coordinate parameters of the video collecting apparatus can be controlled and performed by the above video data obtaining module 21. FIG. 3 is a flowchart further illustrating configuring and determining parameters of the video collecting apparatus in a video monitoring method according to an embodiment of the present disclosure. FIG. 4 is a schematic diagram of a camera coordinate system and a world coordinate system for determining parameters of the video collecting apparatus.

As shown in FIG. 3, the flowchart for configuring and determining parameters of the video collecting apparatus in the video monitoring method according to an embodiment of the present disclosure comprises the following steps.

In step S301, the video collecting apparatus is configured. A depth camera (depth video camera) as the video collecting apparatus is installed in a scene needing to be monitored. Generally, the depth camera (depth video camera) is installed at a height of 2-3.5 meters, and its perspective is looking down upon the ground, as schematically shown in FIG. 4. Here, the video collecting apparatus can be a single depth camera (that is, only have a depth camera lens) or a depth/color double lens camera. In the case of the depth/ color double lens camera, the camera needs to be calibrated to make images obtained by the two lenses corresponding and synchronic with each other. Then, the process enters step S302 to determine coordinate parameters such as real height and angle of the installed video collecting apparatus relative to a reference plane.

In step S302, multiple reference points on a predetermined reference plane are selected. As shown in FIG. 4, the predetermined reference plane can be the ground plane. The more reference points are selected (for example, more than 5), the higher the accuracy is. Then, the process enters step S303.

In step S303, transformation relationship between a camera coordinate system of the video collecting apparatus and a world coordinate system is determined based on coordinate information of the selected multiple reference points. As shown in FIG. 4, a rectangular coordinate system constituted by point Oc and Xc, Yc, and Zc axes is the camera coordinate system. In order to describe the position of the camera, a world coordinate system is introduced, which is a rectangular coordinate system constituted by point Ow and Xw, Yw, and Zw axes. It is possible to select multiple reference points and estimate the transformation matrix from the camera coordinate system to the world coordinate system (i.e., the transformation relationship between the camera coordinate and the world coordinate system) by the least square method. Then, the process enters step S304.

In step S304, coordinate parameters of the video collecting apparatus are determined based on the transformation relationship. It is possible to determine coordinate parameters such as real height and angle of the video collecting apparatus by transforming the camera coordinate system into the world coordinate system using the transformation system. Similarly, it is possible to determine the complete ground plane position in the video scene by transforming the pixels in the video collected by the video collecting apparatus into the world coordinate system.

Figure 5:
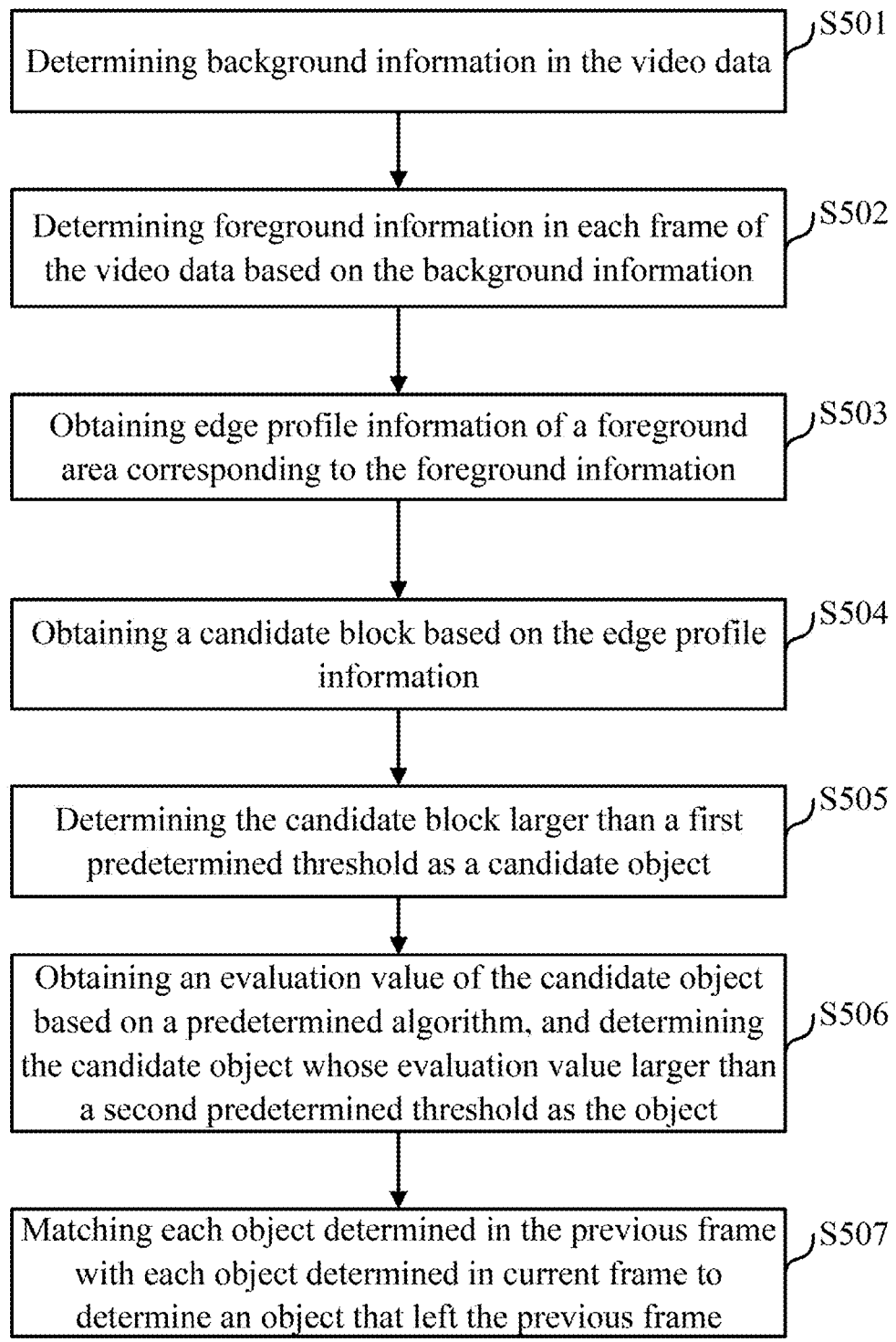
FIG. 5 is a flowchart further illustrating determining the object as a monitoring target in a video monitoring method according to an embodiment of the present disclosure.
Figure 6:
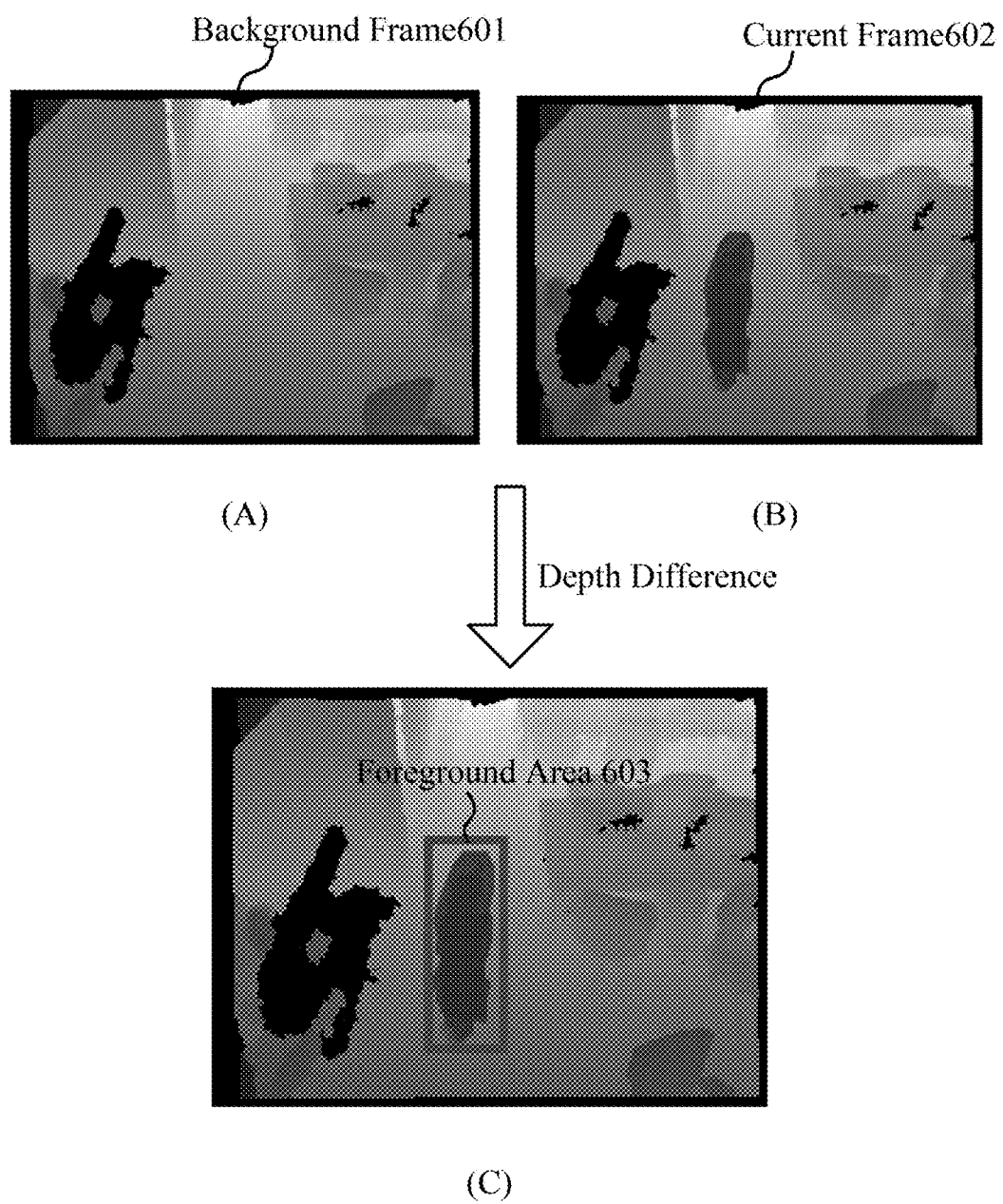
FIG. 6 is a flowchart illustrating determining the foreground information in a video monitoring method according to an embodiment of the present disclosure.

In the following, the determining of the object as the monitoring target is described with reference to FIG. 5 and FIG. 6. The determining of the object as the target object can be controlled and performed by the above monitoring object determining module 22. FIG. 5 is a flowchart further illustrating determining the object as the monitoring target in a video monitoring method according to an embodiment of the present disclosure. FIG. 6 is a schematic diagram illustrating determining the foreground information in a video monitoring method according to an embodiment of the present disclosure.

As shown in FIG. 5, the flowchart for determining the object as the monitoring target in the video monitoring method according to an embodiment of the present disclosure comprises the following steps.

In step S501, background information in the video data is determined. In an embodiment of the present disclosure, when performing background modeling according to the depth video, for example, background frames without any monitoring object can be captured as the background information. FIG. 6 (A) illustrates a background frame 601 as the background information. Then, the processing enters step S502.

In step S502, foreground information in each frame of the video data is determined based on the background information. In an embodiment of the present disclosure, for example, FIG. 6 (B) illustrates current frame 602 of the video data. A foreground area 603 as the foreground information is determined by comparing the background frame 601 with the current frame 602. Then, the process enters step S503.

In step S503, edge profile information of a foreground area corresponding to the foreground information is obtained. According to an embodiment of the present disclosure, an edge detection algorithm is used to obtain edge profile information of the foreground area according to the foreground area determined in the step S502. Then, the process enters step S504.

In step S504, a candidate block is obtained based on the edge profile information. In an embodiment of the present disclosure, double layer profile is used to obtain multiple candidate blocks based on the edge profile obtained in step S503. Then, the process enters step S505.

In step S505, the candidate block larger than a first predetermined threshold is determined as a candidate object. In an embodiment of the present disclosure, the first predetermined threshold is the smallest acceptable area of a candidate block. The candidate block whose area is not larger than the first predetermined threshold may be generated by noise. Therefore, the candidate block whose area is too small is eliminated. Each remaining candidate block represents one candidate object. Then, the process enters step S506.

In step S506, an evaluation value of the candidate object is obtained based on a predetermined algorithm, and the candidate object whose evaluation value larger than a second predetermined threshold is determined as the object. In an embodiment of the present disclosure, it is possible to evaluate each candidate object using a passenger detection algorithm and/or a human head detection algorithm based on a chromatic image, and determine the candidate object whose evaluation value is larger than the second predetermined threshold as the object (for example, as a passenger). In the case of using the passenger detection algorithm, all possible rectangular blocks in a depth video frame are traversed, and each rectangular block represents a candidate area of one passenger. For the area, image features of the gradient histogram are extracted, and then a support vector machine is used for classification to determine whether there is a passenger in the rectangular area. In the case of using the human head detection algorithm, all possible rectangular blocks in a depth video frame are traversed. For each rectangular block, color and texture features are extracted, and then a trained support vector machine is used to determine whether there is a human head in the area. Then, the process enters step S507.

In step S507, each object determined in the previous frame is matched with each object determined in current frame to determine an object that left the previous frame. In an embodiment of the present disclosure, the passenger determined in current frame is matched with the passenger determined in the previous frame. The criteria for the matching can be moving distance of the passenger and the color and texture information extracted from the candidate object. According to the matching result, it is possible to obtain the track result of the same passenger in different frames. For example, assuming there are M detected passengers in the $(t-1)^{th}$ frame and there are N detected passengers in the $t^{th}$ frame, it is needed to obtain the distances between the passengers detected in the $(t-1)^{th}$ frame and each passenger detected in $t^{th}$ frame, wherein the distance can be defined as the spatial distance between head points of the passenger in the two frames. If the smallest distance between a passenger detected in the $(t-1)^{th}$ frame and all passengers in the $t^{th}$ frame is smaller than a predetermined threshold, then the passenger detected in the $(t-1)^{th}$ frame is considered to be matched with the passenger with the smallest distance in the $t^{th}$ frame. If the smallest distance is larger than the predetermined threshold, then the passenger detected in the $(t-1)^{th}$ frame is considered to have left the $t^{th}$ frame, and thus the passenger is not tracked any more.

Figure 7:
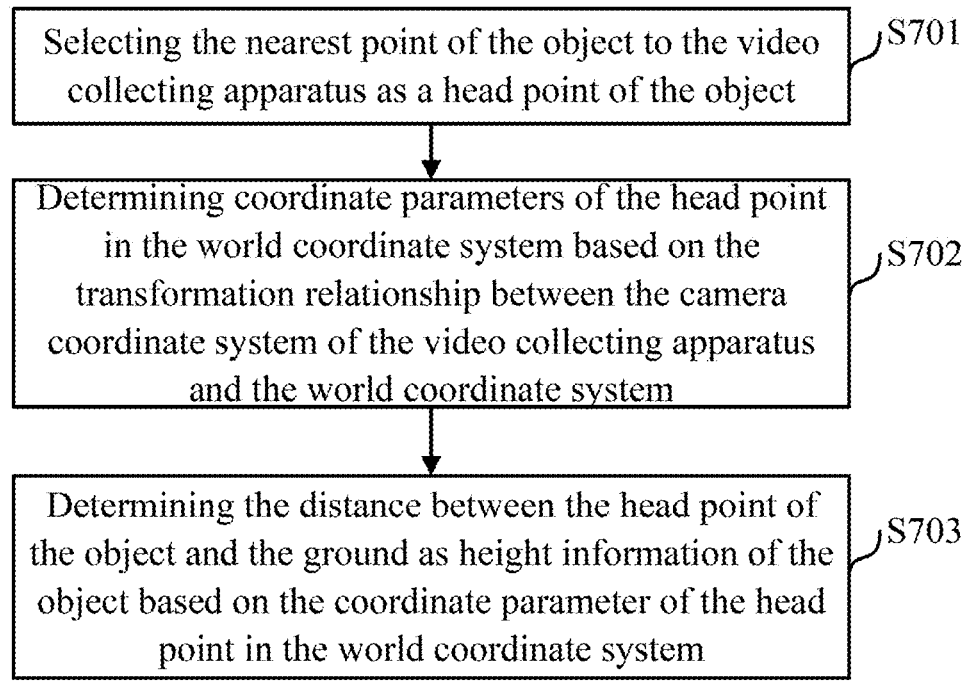
FIG. 7 is a flowchart further illustrating a first example of determining height information of the object in a video monitoring method according to an embodiment of the present disclosure.
Figure 8:
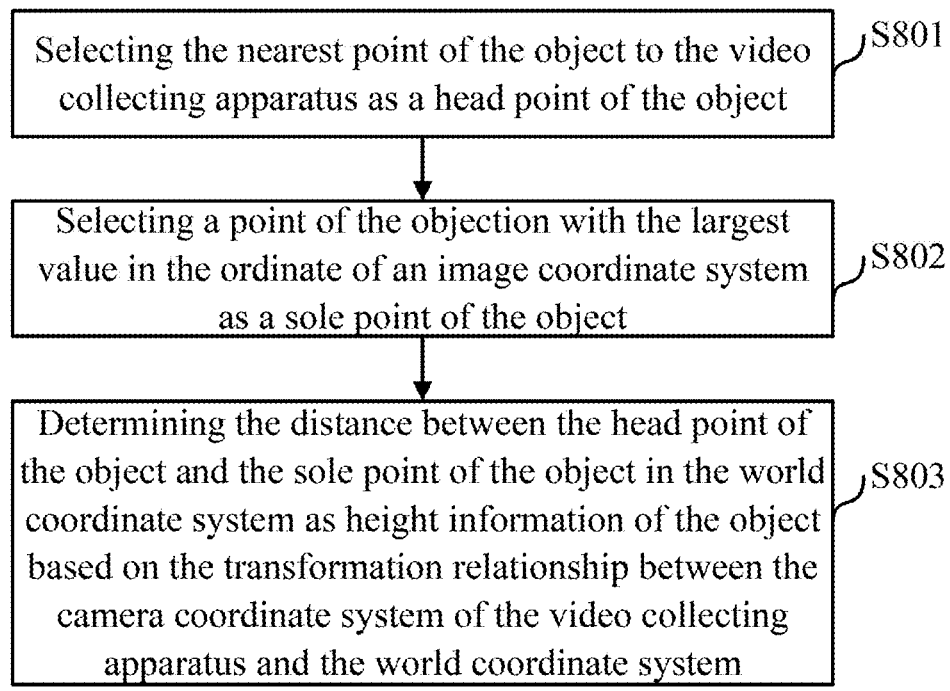
FIG. 8 is a flowchart further illustrating a second example of determining height information of the object in a video monitoring method according to an embodiment of the present disclosure.
Figure 9:
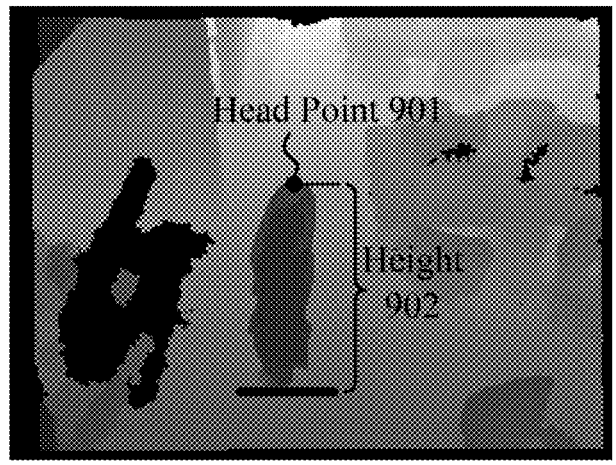
FIG. 9 is a schematic diagram illustrating determining height information of the object in a video monitoring method according to an embodiment of the present disclosure.
Figure 10:
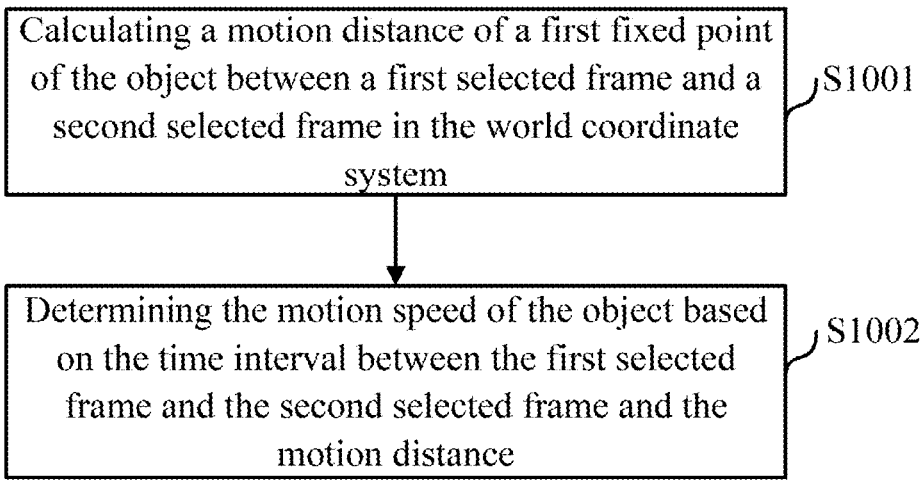
FIG. 10 is a flowchart further illustrating determining motion speed of the object in a video monitoring method according to an embodiment of the present disclosure.
Figure 11:
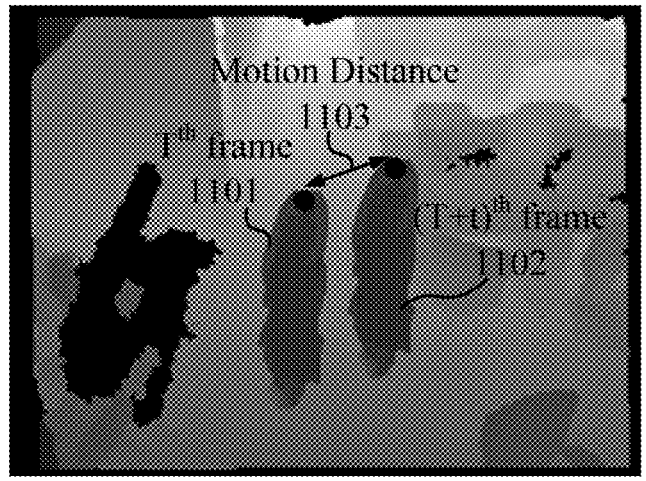
FIG. 11 is a schematic diagram illustrating motion speed of the object in a video monitoring method according to an embodiment of the present disclosure.
Figure 12:
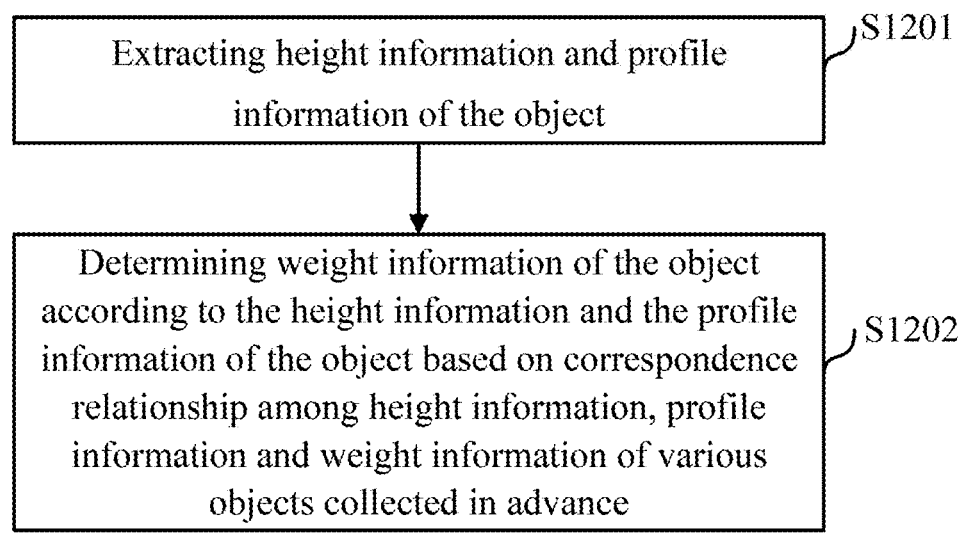
FIG. 12 is a flowchart further illustrating determining weight information of the object in a video monitoring method according to an embodiment of the present disclosure.

In the following, extracting feature information of the object will be described with reference to FIG. 7 to FIG. 12. The extraction of feature information of the object can be controlled and performed by the above feature information extracting module 23. FIG. 7 is a flowchart further illustrating a first example of determining height information of the object in a video monitoring method according to an embodiment of the present disclosure. FIG. 8 is a flowchart further illustrating a second example of determining height information of the object in a video monitoring method according to an embodiment of the present disclosure. FIG. 9 is a schematic diagram illustrating determining height information of the object in a video monitoring method according to an embodiment of the present disclosure. FIG. 10 is a flowchart further illustrating determining motion speed of the object in a video monitoring method according to an embodiment of the present disclosure. FIG. 11 is a schematic diagram illustrating motion speed of the object in a video monitoring method according to an embodiment of the present disclosure. FIG. 12 is a flowchart further illustrating determining weight information of the object in a video monitoring method according to an embodiment of the present disclosure.

As shown in FIG. 7, the flowchart of the first example of determining height information of the object in the video monitoring method according to an embodiment of the present disclosure comprises the following steps.

In step S701, the nearest point of the object to the video collecting apparatus is selected as a head point of the object. In an embodiment of the present disclosure, as shown in FIG. 9, the nearest point of the object to the video collecting apparatus is selected. Because the passenger is standing, the nearest point can be assumed to be a head point 901. Then, the process enters step S702.

In step S702, coordinate parameters of the head point in the world coordinate system are determined based on the transformation relationship between the camera coordinate system of the video collecting apparatus and the world coordinate system. As has been described in the above with reference to FIG. 3 and FIG. 4, it is possible to transform coordinate parameters of the head point in the camera coordinate system of the video collecting apparatus as coordinate parameters in the world coordinate system. Then, the process enters step S703.

In step S703, the distance between the head point of the object and the ground is determined as height information of the object based on the coordinate parameter of the head point in the world coordinate system. In an embodiment of the present disclosure, as shown in FIG. 9, the distance of the head point 901 to the ground is determined as height 902 of the object.

The method for determining height information of the object in the video monitoring method according to an embodiment of the present disclosure is not limited to the first example as shown in FIG. 7. As shown in FIG. 8, the flowchart of the second example of determining height information of the object in the video monitoring method according to an embodiment of the present disclosure comprises the following steps.

In step S801, similar to step S701, the nearest point of the object to the video collecting apparatus is selected as a head point of the object. Then, the process enters step S802.

In step S802, a point of the objection with the largest value in the ordinate of an image coordinate system is selected as a sole point of the object. In an embodiment of the present disclosure, the sole point can be defined as the point of the foreground area of the passenger with the largest value in the ordinate of the image coordinate system. Then, the process enters step S803.

In step S803, the distance between the head point of the object and the sole point of the object in the world coordinate system is determined as height information of the object based on the transformation relationship between the camera coordinate system of the video collecting apparatus and the world coordinate system.

In addition to height information described with reference to FIG. 7 and FIG. 9, the feature information of the object comprises motion speed and weight information among other others of the object.

As shown in FIG. 10, the flowchart for determining motion speed of the object in a video monitoring method according to an embodiment of the present disclosure comprise the following steps.

In step S1001, a motion distance of a first fixed point of the object between a first selected frame and a second selected frame in the world coordinate system is calculated. In an embodiment of the present disclosure, the fixed point can be the head point of the object. The present disclosure is not limited to this, but the fixed point can also be the sole point of the object or any fixed point on the object. In an embodiment of the present disclosure, the first selected frame is the $T^{th}$ frame, and the second selected frame is the $(T+t)^{th}$ frame. As shown in FIG. 11, the object in the first selected frame is object 1101, and it in the second selected frame is object 1102. The motion distance of the first fixed point between the first selected frame (the $T^{th}$ frame) and the second selected frame (the $(T+t)^{th}$ frame) in the world coordinate system is motion distance 1103. Then, the process enters step S1002.

In step S1002, the motion speed of the object is determined based on the time interval between the first selected frame and the second selected frame and the motion distance. In other words, the motion speed of the object can be determined as V=motion distance 1103/t.

As shown in FIG. 12, the flowchart for determining weight information of the object in a video monitoring method according to an embodiment of the present disclosure comprises the following steps.

In step S1201, height information and profile information of the object are extracted. Then, the process enters step S1202.

In step S1202, weight information of the object is determined according to the height information and the profile information of the object based on correspondence relationship among height information, profile information and weight information of various objects collected in advance. According to an embodiment of the present disclosure, a data set containing passengers with different heights and weights is collected first. Then, corresponding profile information of each passenger with different depth in the depth camera is collected. The area of each profile is normalized according to the depth in which the profile is located. Then, the heights of all passengers are quantified (for example, quantified as multiple height ranges), and all data within the same range are fitted to establish relationship between normalized profile area and weight. After the model of correspondence relationship has been established and trained, when weight of a passenger needs to be measured, a weight value determined by the model of correspondence relationship is obtained according to a linear model of the range in which the height of the passenger is located and the normalized profile area of the passenger.

Figure 13:
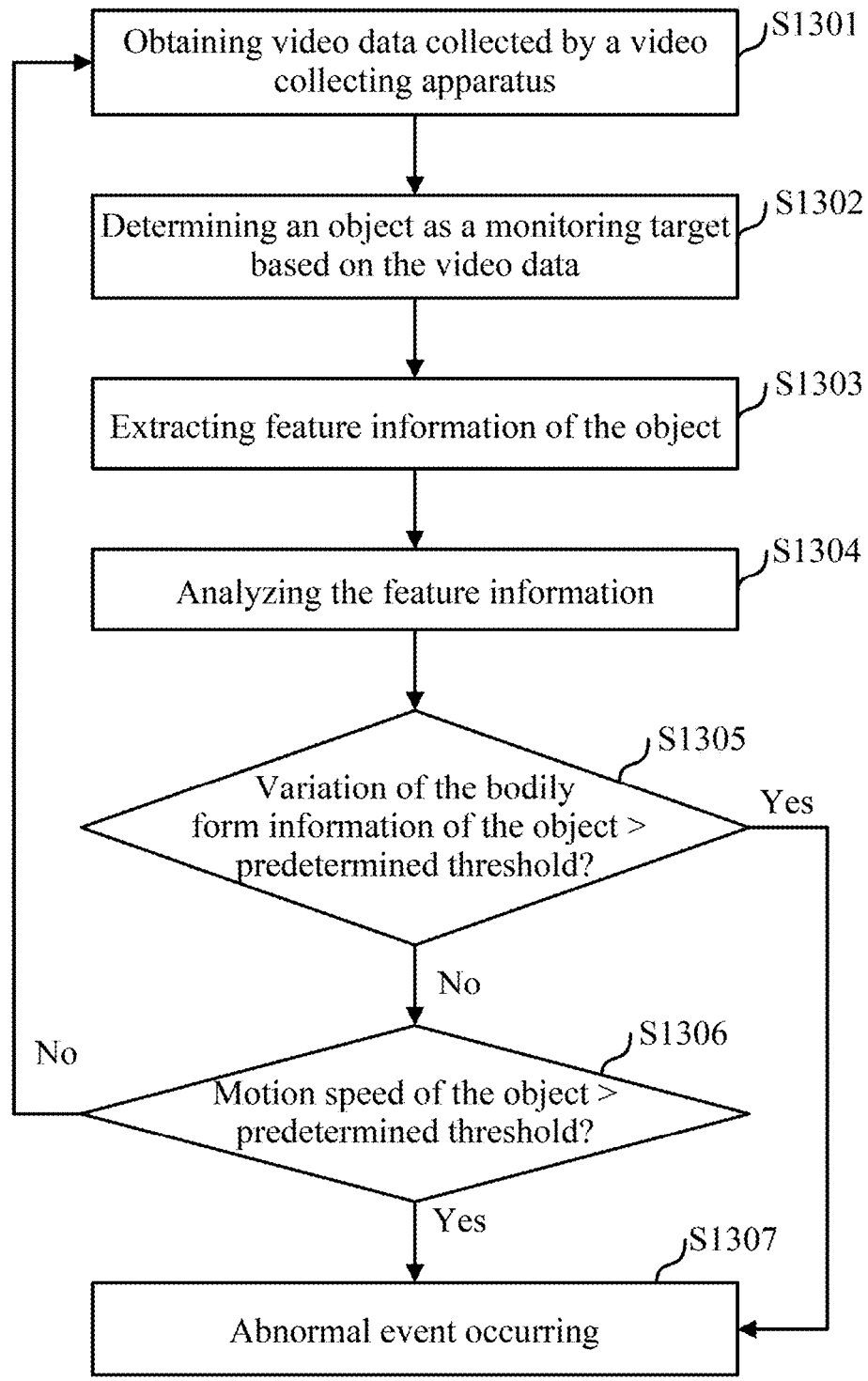
FIG. 13 is a flowchart further illustrating determining an abnormal event of the object in a video monitoring method according to an embodiment of the present disclosure.

The above feature information of the object described with reference to FIG. 7 to FIG. 12 can be further used to monitor abnormal events of the object. FIG. 13 is a flowchart further illustrating determining abnormal events of the objects in a video monitoring method according to an embodiment of the present disclosure.

As shown in FIG. 13, the flowchart for determining abnormal events of the object in a video monitoring method according to an embodiment of the present disclosure comprises the following steps. Step S1301 to step S1303 are the same as step S101 to step S103 described with reference to FIG. 1, whose description will be omitted here.

In step S1304, the feature information is analyzed. The analysis of the feature information can be controlled and performed by the above feature information analyzing module 24. In an embodiment of the present disclosure, analyzing the feature information comprises analyzing the obtained bodily form information and motion speed of the object. Then, the process enters step S1305.

In step S1305, whether variation of the bodily form information of the object is larger than a predetermined threshold is determined. In an embodiment of the present disclosure, if the variation of the height information of a passenger compared with the previous frame is larger than the predetermined threshold (for example, 1 meter), it is determined that an abnormal event such as the passenger falling over himself occurs. If a positive result is obtained in step S1305, the process enters step S1307.

In step S1307, it is determined that an abnormal event has occurred. In an embodiment of the present disclosure, in response to occurrence of abnormal events, an alert that an abnormal event has occurred can be emitted to a monitoring person of the video monitoring system in an appropriate manner.

If a negative result is obtained in step S1305, the process enters step S1306.

In step S1306, determining whether the motion speed of the object is larger than a predetermined threshold is proceeded. In an embodiment of the present disclosure, if the motion speed of the passenger is suddenly larger than the predetermined threshold (for example, 4 m/s), it can be determined that an abnormal event has occurred. If a positive result is obtained in step S1306, the process enters step S1307. On the contrary, if a negative result is obtained in step S1306, it is determined that no abnormal event has occurred based on the analysis of the feature information in step S1304, and the process returns to step S1301. Then, it is continued to obtain video data collected by the video collecting apparatus in real time and perform monitoring.

The above step S1301 and step S1307 are only an exemplary flowchart for determining abnormal events of the object. In other implementations of determining abnormal events of the object, it is possible to only monitor the motion speed of the object, or only monitor the variation of the bodily form information of the object, or monitor both the variation of the bodily form inform of the object and the motion speed of the object, or monitor the motion speed of the object first and then monitor the variation of the bodily form information of the object, which is not limited herein.

Figure 14:
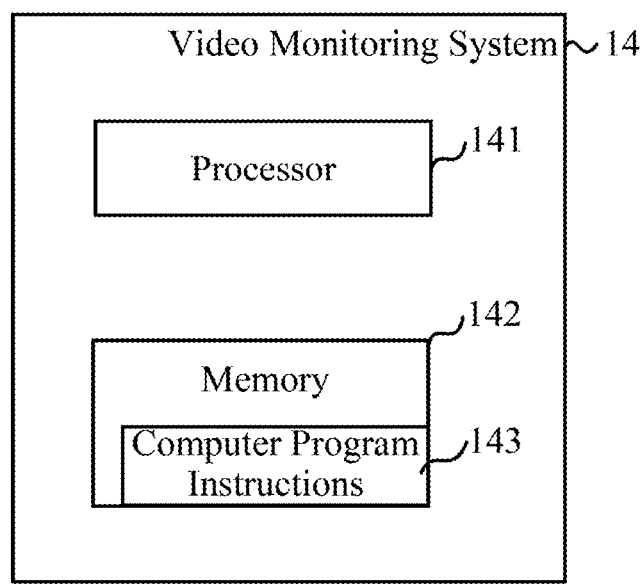
FIG. 14 is a schematic block diagram of a video monitoring system according to an embodiment of the present disclosure.

FIG. 14 is a schematic block diagram of a video monitoring system of an embodiment of the present disclosure.

As shown in FIG. 14, the video monitoring system according to an embodiment of the present disclosure comprises: a processor 141, a memory 142 and computer program instructions 142 stored in the memory 142.

The computer program instructions 143 can realize functions of each functional block of the video monitoring system according to an embodiment of the present disclosure and/or perform each step of the video monitoring method according to an embodiment of the present disclosure when executed by the processor 141.

In particular, the computer program instructions 143, when executed by the processor 141, perform the steps of: obtaining video data collected by a video collecting apparatus; determining an object as a monitoring target based on the video data; and extracting feature information of the object, wherein the video data is video data containing depth information.

For example, the computer program instructions 143, when executed by the processor 141, further perform the steps of: selecting multiple reference points on a predetermined reference plane; determining transformation relationship between a camera coordinate system of the video collecting apparatus and a world coordinate system based on coordinate information of the multiple reference points; and determining the coordinate parameters of the video collecting apparatus based on the transformation relationship.

Further, the step of determining an object as a monitoring target based on the video data performed by the computer program instructions 143 when executed by the processor 141 comprises: determining background information in the video data; determining foreground information in each frame of the video data based on the background information; obtaining edge profile information of a foreground area corresponding to the foreground information; and determining the object based on the edge profile information.

Further, the step of determining the object based on the edge profile information performed by the computer program instructions 143 when executed by the processor 141 comprises: obtaining a candidate block based on the edge profile information; determining the candidate block larger than a first predetermined threshold as a candidate object; and obtaining an evaluation value of the candidate object based on a predetermined algorithm, and determining the candidate object whose evaluation value larger than a second predetermined threshold as the object.

Further, the step of determining the object based on the edge profile information performed by the computer program instructions 143 when executed by the processor 141 further comprises: matching each object determined in the previous frame with each object determined in current frame to determine an object that left the previous frame.

Further, the feature information of the object comprises bodily form information and motion speed of the object.

Further, the step of extracting the bodily form information of the object performed by the computer program instructions 143 when executed by the processor 141 comprises: selecting the nearest point of the object to the video collecting apparatus as a head point of the object; determining coordinate parameters of the head point in the world coordinate system based on the transformation relationship between the camera coordinate system of the video collecting apparatus and the world coordinate system; and determining the distance between the head point of the object and the ground as height information of the object based on the coordinate parameter of the head point in the world coordinate system.

Further, the step of extracting the bodily form information of the object performed by the computer program instructions 143 when executed by the processor 141 comprises: selecting the nearest point of the object to the video collecting apparatus as a head point of the object; selecting a point of the objection with the largest value in the ordinate of an image coordinate system as a sole point of the object; determining the distance between the head point of the object and the sole point of the object in the world coordinate system as height information of the object based on the transformation relationship between the camera coordinate system of the video collecting apparatus and the world coordinate system.

Further, the step of extracting the feature information of the object performed by the computer program instructions 143 when executed by the processor 141 further comprises: calculating a motion distance of a first fixed point of the object between a first selected frame and a second selected frame in the world coordinate system; determining the motion speed of the object based on the time interval between the first selected frame and the second selected frame and the motion distance.

Further, the step of extracting the bodily form information of the object performed by the computer program instructions 143 when executed by the processor 141 further comprises: extracting height information and profile information of the object; determining weight information of the object according to the height information and the profile information of the object based on correspondence relationship among height information, profile information and weight information of various objects collected in advance.

Further, the computer program instructions 143, when executed by the processor 141, further perform the steps of: analyzing the feature information and determining an abnormal event of the object, and the step of determining an abnormal event of the object performed by the computer program instructions when executed by the processor comprises: determining the abnormal event of the object when the variation of the bodily form information in a predetermined period of time is larger than a predetermined third threshold and/or when the motion speed of the object is larger than a fourth threshold.

Each module in the video monitoring system according to an embodiment of the present disclosure can be realized through the processor in the video monitoring system according to the embodiment of the present disclosure executing computer program instructions stored in the memory, or can be realized when computer instructions stored in the computer readable storage medium of a computer program product according to an embodiment of the present disclosure are executed by a computer.

The computer readable storage medium can be any combination of one or more computer readable storage media. For example, a computer readable storage medium comprises computer readable program codes for randomly generating a series of action instructions, and another computer readable storage medium comprises computer readable program codes for identifying human face action.

For example, the computer readable storage medium can include a storage card of a smart phone, a storage component of a pad computer, a hard drive of a personal computer, random access memory (RAM), read only memory (ROM), erasable programmable read only memory (EPROM), compact disk-read only memory (CD-ROM), USB memory, or any combination of the above storage media.

The above detailed exemplary embodiments of the present disclosure are only illustrative, but not limiting. Those skilled in the art should understand that various modifications, combinations or sub-combinations of those embodiments can be made without departing from the principle and spirit of the present disclosure, and such modifications should fall in the scope of the present disclosure.

What is claimed is:

1. A video monitoring method comprising:
    obtaining video data collected by a video collecting apparatus;
    determining an object as a monitoring target based on the video data; and
    extracting feature information of the object,
    wherein the video data is video data containing depth information, and
    wherein determining the object as the monitoring target based on the video data comprises:
        determining background information in the video data;
        determining foreground information in each frame of the video data based on the background information;
        obtaining edge profile information of a foreground area corresponding to the foreground information;
        obtaining a candidate block based on the edge profile information;
        determining the candidate block larger than a first predetermined threshold as a candidate object;
        obtaining an evaluation value of the candidate object based on a predetermined algorithm; and
        determining the candidate object whose evaluation value is larger than a second predetermined threshold as the object.

2. The video monitoring method according to claim 1, further comprising:
    configuring the video collecting apparatus and determining coordinate parameters of the video collecting apparatus.

3. The video monitoring method according to claim 2, wherein determining coordinate parameters of the video collecting apparatus comprise:
    selecting multiple reference points on a predetermined reference plane;
    determining transformation relationship between a camera coordinate system of the video collecting apparatus and a world coordinate system based on coordinate information of the multiple reference points; and
    determining the coordinate parameters of the video collecting apparatus based on the transformation relationship.

4. The video monitoring method according to claim 1, further comprising:
    matching each object determined in the previous frame with each object determined in current frame to determine an object that left the previous frame.

5. The video monitoring method according to claim 1, wherein the feature information of the object comprises bodily form information and motion speed of the object.

6. The video monitoring method according to claim 5, wherein extracting the bodily form information of the object comprises:
    selecting the nearest point of the object to the video collecting apparatus as a head point of the object;
    determining coordinate parameters of the head point in the world coordinate system based on the transformation relationship between the camera coordinate system of the video collecting apparatus and the world coordinate system; and
    determining the distance between the head point of the object and the ground as height information of the object based on the coordinate parameter of the head point in the world coordinate system.

7. The video monitoring method according to claim 5, wherein extracting the bodily form information of the object comprises:
selecting the nearest point of the object to the video collecting apparatus as a head point of the object;
selecting a point of the object with the largest value in an ordinate of an image coordinate system as a sole point of the object; and
determining the distance between the head point of the object and the sole point of the object in the world coordinate system as height information of the object based on the transformation relationship between the camera coordinate system of the video collecting apparatus and the world coordinate system.

8. The video monitoring method according to claim 5, further comprising:
calculating a motion distance of a first fixed point of the object between a first selected frame and a second selected frame in the world coordinate system;
determining the motion speed of the object based on the time interval between the first selected frame and the second selected frame and the motion distance.

9. The video monitoring method according to claim 5, wherein extracting the bodily form information of the object further comprises:
extracting height information and profile information of the object;
determining weight information of the object according to the height information and the profile information of the object based on correspondence relationship among height information, profile information and weight information of various objects collected in advance.

10. The video monitoring method according to claim 5, further comprising:
analyzing the feature information and determining an abnormal event of the object,
wherein analyzing the feature information and determining an abnormal event of the object comprises
determining the abnormal event of the object when the variation of the bodily form information in a predetermined period of time is larger than a predetermined third threshold and/or when the motion speed of the object is larger than a fourth threshold.

11. A video monitoring system comprising:
a processor;
a memory; and
computer program instructions stored in the memory, which, when executed by the processor, perform the steps of:
obtaining video data collected by a video collecting apparatus;
determining an object as a monitoring target based on the video data; and
extracting feature information of the object,
wherein the video data is video data containing depth information, and
wherein the step of determining the object as the monitoring target based on the video data performed by the computer program instructions when executed by the processor comprises:
determining background information in the video data;
determining foreground information in each frame of the video data based on the background information;
obtaining edge profile information of a foreground area corresponding to the foreground information;
obtaining a candidate block based on the edge profile information;
determining the candidate block larger than a first predetermined threshold as a candidate object;
obtaining an evaluation value of the candidate object based on a predetermined algorithm; and
determining the candidate object whose evaluation value is larger than a second predetermined threshold as the object.

12. The video monitoring system according to claim 11, further comprising the video collecting apparatus for collecting the video data.

13. The video monitoring system according to claim 12, wherein the computer program instructions, when executed by the processor, further perform the steps of:
selecting multiple reference points on a predetermined reference plane;
determining transformation relationship between a camera coordinate system of the video collecting apparatus and a world coordinate system based on coordinate information of the multiple reference points; and
determining the coordinate parameters of the video collecting apparatus based on the transformation relationship.

14. The video monitoring system according to claim 11, wherein when executed by the processor, the computer program instructions further perform the step of:
matching each object determined in the previous frame with each object determined in current frame to determine an object that left the previous frame.

15. The video monitoring system according to claim 11, wherein the feature information of the object comprises bodily form information and motion speed of the object.

16. The video monitoring system according to claim 15, wherein the step of extracting the bodily form information of the object performed by the computer program instructions when executed by the processor comprises:
selecting the nearest point of the object to the video collecting apparatus as a head point of the object;
determining coordinate parameters of the head point in the world coordinate system based on the transformation relationship between the camera coordinate system of the video collecting apparatus and the world coordinate system; and
determining the distance between the head point of the object and the ground as height information of the object based on the coordinate parameter of the head point in the world coordinate system.

17. The video monitoring system according to claim 15, wherein the step of extracting the bodily form information of the object performed by the computer program instructions when executed by the processor comprises:
selecting the nearest point of the object to the video collecting apparatus as a head point of the object;
selecting a point of the object with the largest value in an ordinate of an image coordinate system as a sole point of the object; and
determining the distance between the head point of the object and the sole point of the object in the world coordinate system as height information of the object based on the transformation relationship between the camera coordinate system of the video collecting apparatus and the world coordinate system.

18. The video monitoring system according to claim 15, the step of extracting the feature information of the object performed by the computer program instructions when executed by the processor further comprises:
  calculating a motion distance of a first fixed point of the object between a first selected frame and a second selected frame in the world coordinate system;
  determining the motion speed of the object based on the time interval between the first selected frame and the second selected frame and the motion distance.

19. The video monitoring system according to claim 15, wherein the step of extracting the bodily form information of the object performed by the computer program instructions when executed by the processor further comprises:
  extracting height information and profile information of the object;
  determining weight information of the object according to the height information and the profile information of the object based on correspondence relationship among height information, profile information and weight information of various objects collected in advance.

20. The video monitoring system according to claim 15, wherein the computer program instructions, when executed by the processor, further perform the steps of:
  analyzing the feature information and determining an abnormal event of the object, and the step of determining an abnormal event of the object performed by the computer program instructions when executed by the processor comprises:
  determining the abnormal event of the object when the variation of the bodily form information in a predetermined period of time is larger than a predetermined third threshold and/or when the motion speed of the object is larger than a fourth threshold.

21. A non-transitory computer program product comprising a computer readable storage medium on which computer program instructions are stored, wherein the computer program instructions, when executed by the processor, perform the steps of:
  obtaining video data collected by a video collecting apparatus;
  determining an object as a monitoring target based on the video data; and
  extracting feature information of the object,
  wherein the video data is video data containing depth information, and
  wherein the step of determining the object as the monitoring target based on the video data performed by the computer program instructions when executed by the processor comprises:
  determining background information in the video data;
  determining foreground information in each frame of the video data based on the background information;
  obtaining edge profile information of a foreground area corresponding to the foreground information;
  obtaining a candidate block based on the edge profile information;
  determining the candidate block larger than a first predetermined threshold as a candidate object;
  obtaining an evaluation value of the candidate object based on a predetermined algorithm; and
  determining the candidate object whose evaluation value is larger than a second predetermined threshold as the object.

* * * * *